(12) United States Patent
Shelton

(10) Patent No.: US 11,686,334 B2
(45) Date of Patent: *Jun. 27, 2023

(54) SPLICE PLATE FOR CABLE TRAY FITTING

(71) Applicant: Eaton Intelligent Power Limited, Dublin (IE)

(72) Inventor: Travis Cole Shelton, Edwardsville, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 160 days.

This patent is subject to a terminal disclaimer.

(21) Appl. No.: 17/169,153

(22) Filed: Feb. 5, 2021

(65) Prior Publication Data

US 2021/0231146 A1 Jul. 29, 2021

Related U.S. Application Data

(63) Continuation of application No. 15/431,370, filed on Feb. 13, 2017, now Pat. No. 10,935,060.

(51) Int. Cl.
| | |
|---|---|
| *F16B 7/04* | (2006.01) |
| *H02G 3/06* | (2006.01) |
| *F16B 7/18* | (2006.01) |
| *H02G 3/04* | (2006.01) |

(52) U.S. Cl.
CPC ......... *F16B 7/0426* (2013.01); *H02G 3/0608* (2013.01); *F16B 7/182* (2013.01); *H02G 3/0456* (2013.01)

(58) Field of Classification Search
CPC ..... F16B 7/0426; F16B 7/182; H02G 3/0443; H02G 3/0456; H02G 3/0608; Y10T 403/49947; Y10T 403/551; Y10T 403/57; Y10T 403/5761; Y10T 403/5786; Y10T 403/7123
USPC ........... 403/289, 291, 292, 300; 52/848, 849
See application file for complete search history.

(56) References Cited

U.S. PATENT DOCUMENTS

| | | | |
|---|---|---|---|
| 4,140,417 A | | 2/1979 | Danielsen et al. |
| 4,335,973 A | * | 6/1982 | Beck ......................... E04B 9/10 403/205 |
| 4,512,680 A | | 4/1985 | Tomaszewski |
| 4,516,874 A | | 5/1985 | Yang et al. |
| 6,193,434 B1 | | 2/2001 | Durin et al. |
| 6,247,871 B1 | | 6/2001 | Nickel et al. |
| 6,299,001 B1 | | 10/2001 | Frolov et al. |
| 6,313,405 B1 | | 11/2001 | Rinderer |
| 6,926,236 B2 | | 8/2005 | Jette |

(Continued)

FOREIGN PATENT DOCUMENTS

| | | |
|---|---|---|
| CN | 200969500 Y | 10/2007 |
| CN | 204886055 U | 12/2015 |

(Continued)

*Primary Examiner* — Matthew R McMahon
(74) *Attorney, Agent, or Firm* — Stinson LLP

(57) ABSTRACT

A fitting splice plate connects a cable tray fitting to a cable tray section. The fitting splice plate includes a guard extending in an outboard direction from a second longitudinal portion of a plate body adjacent a first longitudinal portion of the plate body. The guard is adjacent one of an upper side and a lower side of the second longitudinal portion. The fitting splice plate may include both upper and lower guards.

19 Claims, 10 Drawing Sheets

(56) References Cited

U.S. PATENT DOCUMENTS

| | | | |
|---|---|---|---|
| 7,452,157 B2* | 11/2008 | Deciry | H02G 3/0443 |
| | | | 174/64 |
| 7,544,895 B2* | 6/2009 | Penichon | H02G 3/0608 |
| | | | 24/295 |
| 7,608,786 B2 | 10/2009 | Deciry et al. | |
| 7,903,924 B2* | 3/2011 | Pollard, Jr. | H02G 3/0608 |
| | | | 248/302 |
| 8,459,604 B2 | 6/2013 | Smith et al. | |
| 9,178,343 B2* | 11/2015 | Brouwer | F16B 7/0493 |
| 9,209,609 B2 | 12/2015 | Kellerman et al. | |
| 9,556,930 B2 | 1/2017 | Daniels | |
| 10,547,162 B1* | 1/2020 | Lukovic | H02G 3/0608 |
| 2003/0116682 A1 | 6/2003 | Finco et al. | |
| 2010/0086348 A1 | 4/2010 | Funahashi et al. | |
| 2011/0013978 A1 | 1/2011 | Smith et al. | |
| 2012/0292266 A1 | 11/2012 | Smith et al. | |
| 2016/0322798 A1 | 11/2016 | Tally et al. | |

FOREIGN PATENT DOCUMENTS

| | | | | |
|---|---|---|---|---|
| CN | 205724709 U | 11/2016 | | |
| EP | 1 193 821 A1 | 4/2002 | | |
| EP | 1 793 464 A1 | 6/2007 | | |
| EP | 2 518 845 A1 | 10/2012 | | |
| EP | 2518845 A1 * | 10/2012 | | E06C 1/10 |
| EP | 2 833 496 A1 | 2/2015 | | |
| FR | 2 723 168 A1 | 2/1996 | | |
| FR | 2 814 602 A1 | 3/2002 | | |
| JP | S53-044298 U | 4/1978 | | |
| KR | 101544949 B1 | 8/2015 | | |

* cited by examiner

SPLICE PLATE FOR CABLE TRAY FITTING

REFERENCE TO RELATED APPLICATION

The present application is a continuation of U.S. patent application Ser. No. 15/431,370, filed Feb. 13, 2017, now U.S. Pat. No. 10,935,060, the entire contents of which are incorporated herein by reference.

BACKGROUND OF THE DISCLOSURE

Ladder-type cable tray is used by industry to support electrical cable, for example. A length or section of ladder cable tray comprises a pair of side rails connected by cable-supporting rungs extending between the rails at intervals along the tray. Cable tray sections and fittings are spliced together using splice plates to form a cable tray assembly.

SUMMARY OF THE DISCLOSURE

In one aspect, a fitting splice plate for connecting a cable tray fitting to a cable tray section generally comprises a plate body having a generally planar shape. The plate body has a first longitudinal portion configured to connect to the cable tray section, and a second longitudinal portion configured to connect to the cable tray fitting. The first longitudinal portion has a width extending between upper and lower sides thereof. A guard extends in an outboard direction from the second longitudinal portion adjacent the first longitudinal portion. The guard is adjacent one of an upper side and a lower side of the second longitudinal portion.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
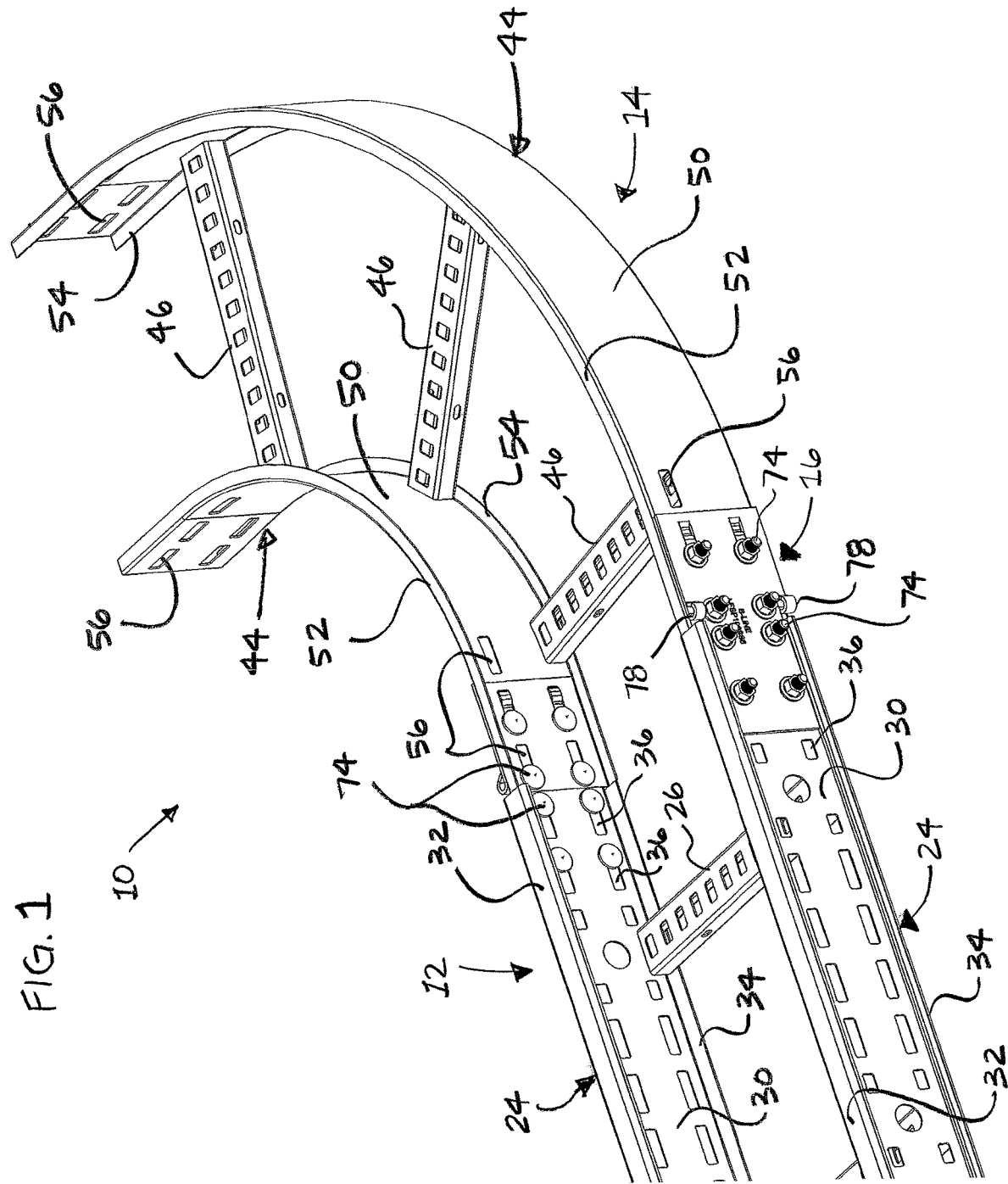
FIG. 1 is a perspective of a cable tray assembly including a cable tray section, a cable tray fitting, and fitting splice plates.

Referring now to the drawings, and in particular to FIG. 1, a cable tray assembly constructed according to the teachings of the present disclosure is generally indicated at reference numeral 10. The cable tray assembly includes a cable tray section, generally indicated at 12; a cable tray fitting, generally indicated at 14; and fitting splice plates, each generally indicated at 16, connecting together the cable tray section and the cable tray fitting. As used herein, terms denoting relative locations and positions of components and structures, including but not limited to "upper," "lower," "left," "right," "front," and "rear," are in reference to the cable tray assembly 10 in the horizontal orientation, as shown in FIG. 1. It is understood that these terms are used for ease of description and not meant in a limiting sense. It is understood that the cable tray assembly 10 may be in a vertical orientation in the field, whereby the relative locations and positions of the components and structures would be different than as shown in the drawings. As used herein, the term "inboard" means toward or in the interior of the cable tray section 12, cable tray fitting 16, and/or cable tray assembly 10. As used herein, the term "outboard" means away from the interior or at the exterior of the cable tray section 12, cable tray fitting 14, and/or cable tray assembly 10.

Figure 2:
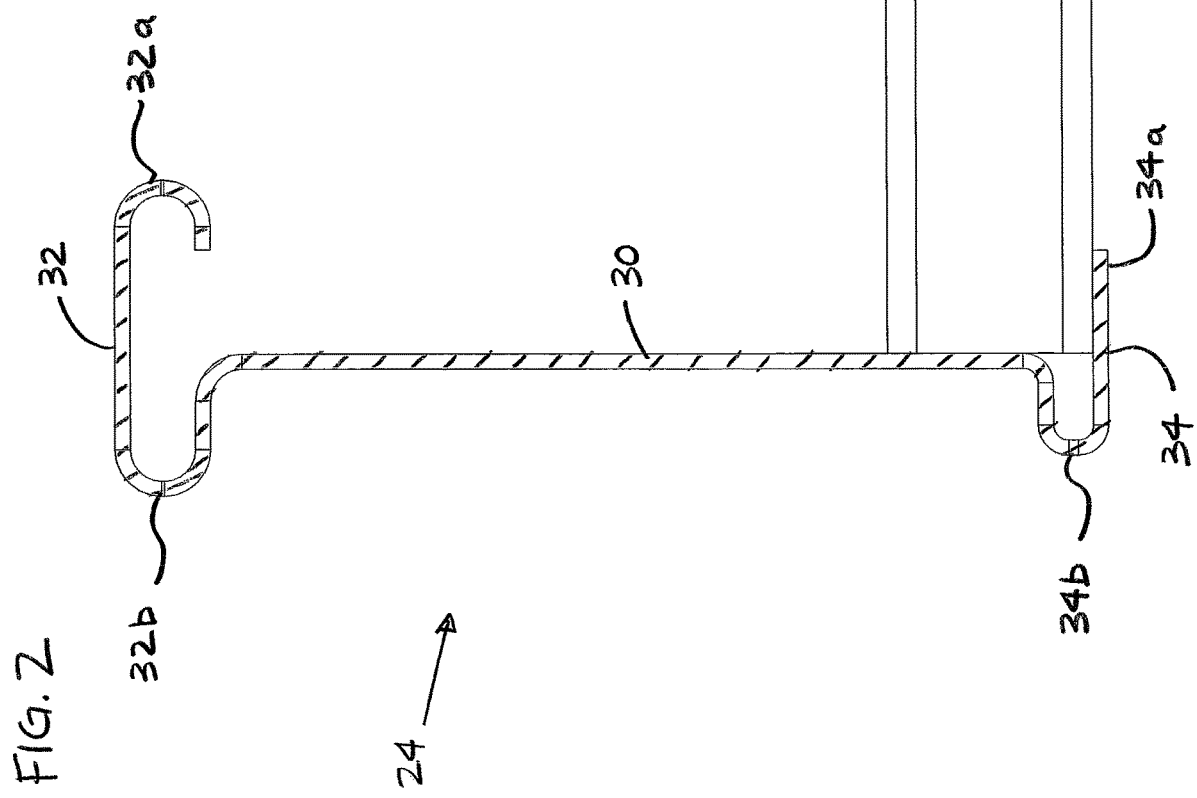
FIG. 2 is an enlarged cross section of a rail of the cable tray section.
Figure 3:
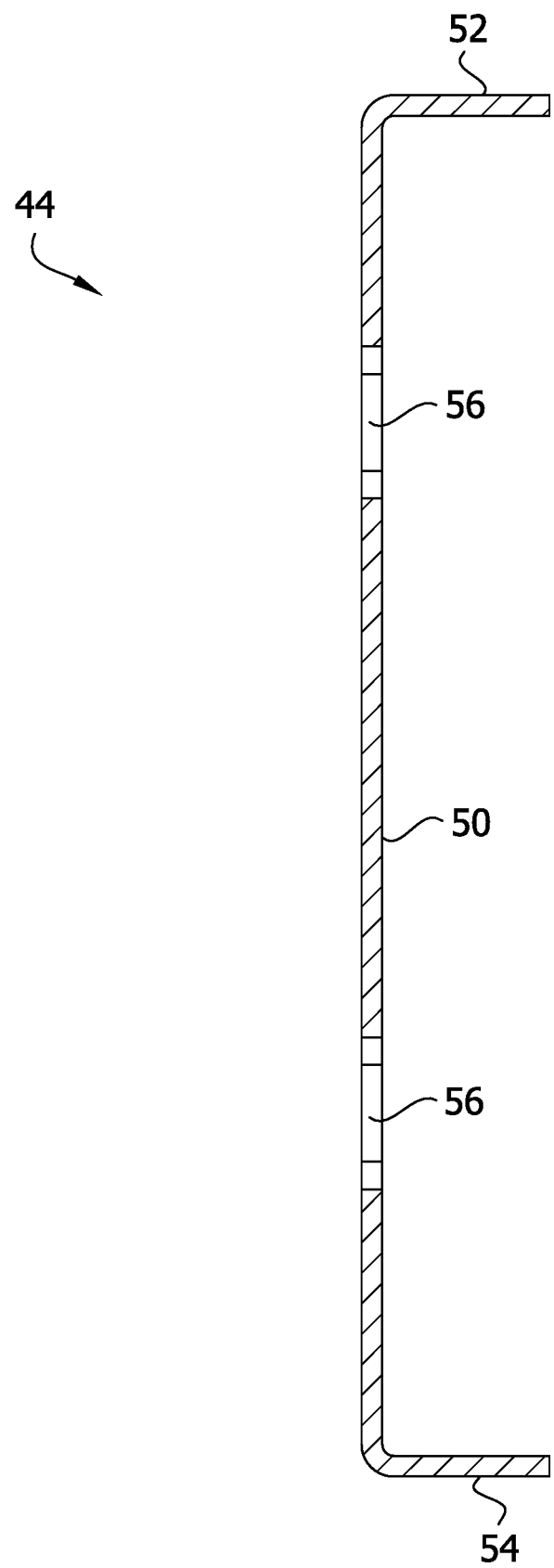
FIG. 3 is an enlarged cross section of a rail of the cable tray fitting.

Referring to FIGS. 1 and 2, the cable tray section 12 includes two parallel rails, generally indicated at 24, (e.g., straight rails) forming the sides of the cable tray section, and a plurality of cable-supporting rungs 26 extending between the rails 24 at intervals spaced lengthwise of the section. Each rail 24 has a generally I-shaped cross section or profile, broadly a first cross-sectional shape (e.g., general I-shaped beam). Each rail 24 may have other cross-sectional shapes. Each rail 24 comprises a generally vertical web 30, an upper generally horizontal flange 32 at the upper end of the web having inboard and outboard portions 32a, 32b, and a lower generally horizontal flange 34 at the lower end of the web having inboard and outboard portions, 34a, 34b. The rungs 26 are secured (e.g., by welding) to the inboard portions 34a of the lower flanges 34. Pre-formed fastener holes 36 (e.g., square or rectangular shaped openings) are defined by the webs 30 adjacent opposite ends of the rails 24 for use in connecting the fitting splice plates 16 to the cable tray section 12, as will be described. The length of each manufactured cable tray section 12 may also vary (e.g., from 10-30 feet). Sections 12 are often cut to fit in the field to varying lengths.

The illustrated cable tray fitting 14 comprises two rails, generally indicated at 44, (e.g., curved rails) forming the sides of the cable tray fitting, and a plurality of cable-supporting rungs 46 extending between the rails 44 at intervals spaced lengthwise of the fitting. Each rail 44 has a generally C-shaped cross section, broadly a second cross-sectional shape (e.g., general C-shaped beam). Each rail 44 may have other cross-sectional shapes. Each rail 44 comprises a generally vertical web 50, an upper generally horizontal flange 52 at the upper side of the web extending in an inboard direction, and a lower generally horizontal flange 54 at the lower end of the web extending in an inboard direction. The rungs 46 are secured (e.g., by welding) to the inboard portions of the lower flanges 54 extending inboard from respective webs. Pre-formed fastener holes 56 (e.g., square or rectangular shaped openings) are defined by the webs 50 adjacent opposite ends of the rails 44 for use in connecting the fitting splice plates 16 to the cable tray fitting 14, as will be described. The illustrated cable tray fitting 14 is configured as a horizontal bend fitting (e.g., 90° horizontal bend). In other embodiments, the cable tray fitting 14 may be configured, for example, as a 30°, 45°, or 60° horizontal bend fitting; or a horizontal tee; or a horizontal cross; or left, straight, or right reducer; or a horizontal reducing tee; or a horizontal expanding tee; or a horizontal expanding/reducing cross; or a left hand or right hand horizontal wye; or a 90° vertical outside or inside bend; or a 60° vertical outside or inside bend; or a 45° vertical outside or inside bend; a 30° vertical outside or inside bend; or a vertical up or down tee; or a cable support fitting. The cable tray fitting may be of other configurations.

Figure 9:
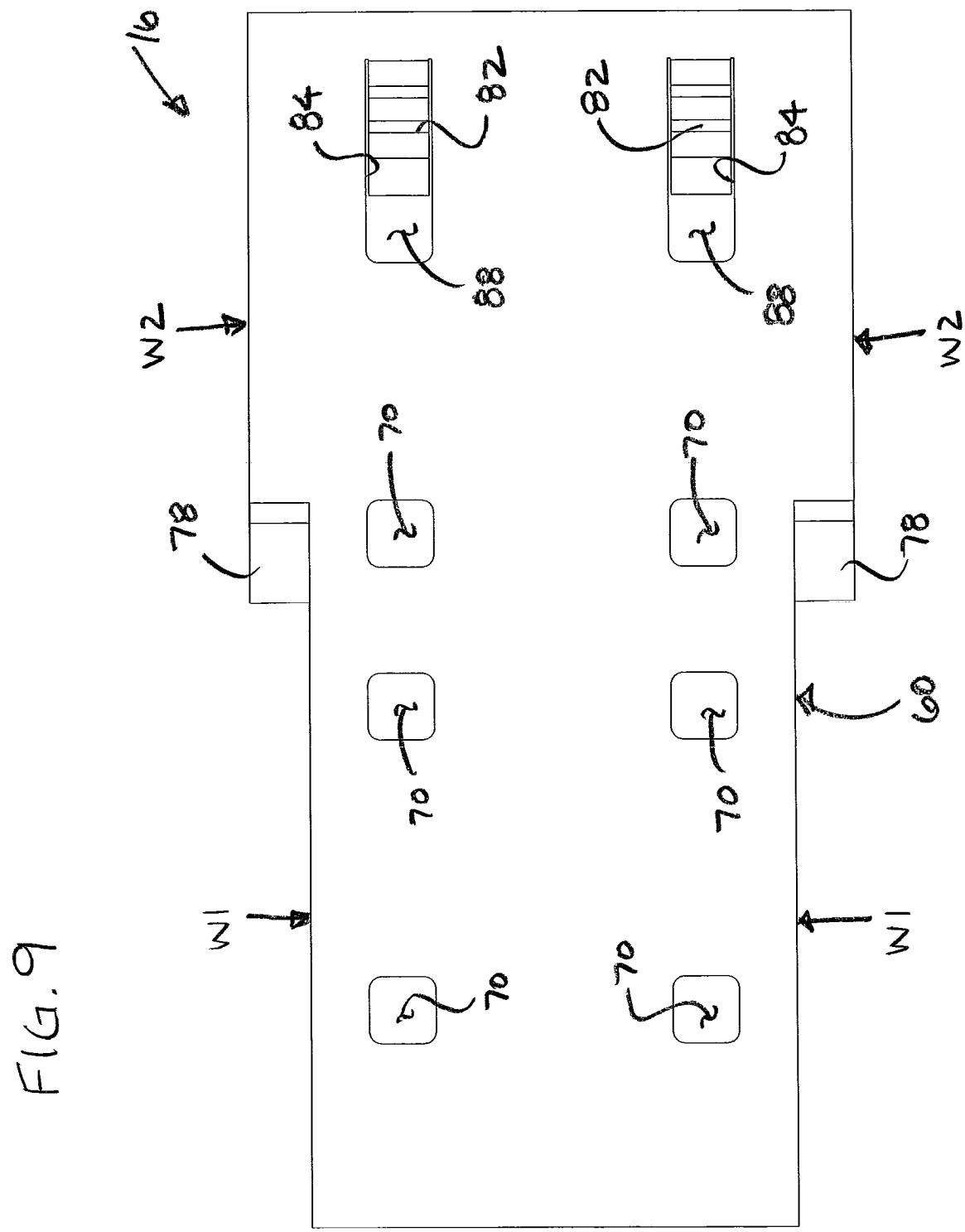
FIG. 9 is a front elevation of the fitting splice plate.
Figure 10:
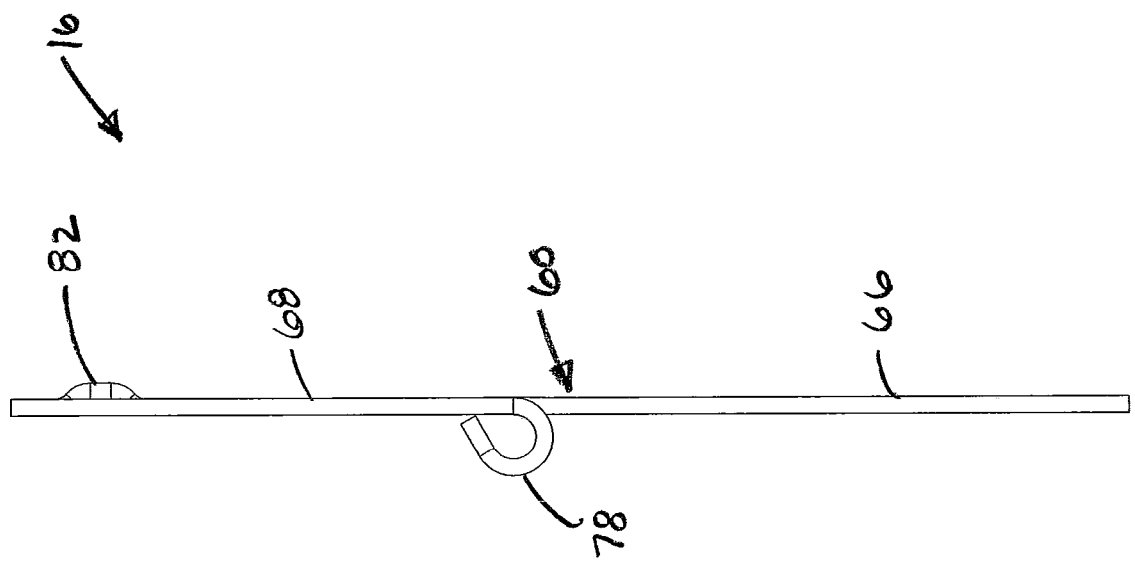
FIG. 10 is a top plan view of the fitting splice plate.

Referring to FIGS. 7-10, the fitting splice plate 16 includes a plate body, generally indicated at 60, having a generally planar shape with an inboard face 62 and an outboard face 64. The plate body 60 has a first longitudinal portion 66 for connecting to the cable tray section 12, and a second longitudinal portion 68 for connecting to the cable tray fitting 14. As shown in FIG. 9, width W1 (e.g., maximum width) of the first longitudinal portion 66 extending between upper and lower sides thereof is less than a width W2 (e.g., maximum width) of the second longitudinal portion extending between upper and lower sides thereof. Each of the first and second longitudinal portions 66, 68 defines fastener openings 70 that are alignable with corresponding fastener openings 36, 56 in the respective cable tray section 12 and cable tray fitting 14 and through which fasteners 74 are received. The plate body 60 may be integrally formed as a single, one-piece, monolithically formed component.

Upper and lower guards 78 of the fitting splice plate 16 extend in the outboard direction from respective upper and lower sides of the second longitudinal portion 68 adjacent the first longitudinal portion 66. As explained in more detail below, the upper and lower guards 78 shield the outboard portions 32a, 34a of the respective upper and lower flanges 32, 34 of the corresponding rail 24 of the cable tray section 12. In the illustrated embodiment, the upper and lower guards 78 comprise interned fingers folded over the outboard face 64 of the second longitudinal portion 68 to define a generally round edge. The guards 78 may be integrally formed with the plate body 60 as a single, one-piece, monolithically formed component. In one example, the guards 78 and the plate body 60 may be formed from a piece of sheet metal, whereby suitable cutting and folding processes form the plate body and the guards.

Alignment tabs 82 (e.g., upper and lower tabs) of the fitting splice plate 16 extend in the inboard direction from plate body 60. As explained in more detail below, the alignment tabs 82 are configured to be inserted into corresponding ones of the fastener openings 56 in the web 50 of the cable tray fitting 14 to align the fitting splice plate 16 on the fitting. In the illustrated embodiment, the alignment tabs 82 extend from the second longitudinal portion 68, although in other embodiments the alignment tabs may extend from the first longitudinal portion 66 or both the first and second longitudinal portions. In the illustrated embodiment, each alignment tab 82 comprises a tongue received in slot-shaped tongue opening 84 extending along the length of the body 60. Each tongue has an attached longitudinal end attached to the plate body 60, a free end free from attachment to the plate body, and upper and lower sides free from attachment to the plate body. As such, each tongue is cantilevered. Each tongue is bent along its length so that a portion thereof projects outward from the tongue opening 84. The free end of the tongue is spaced apart from a longitudinal end of the tongue opening 84 to define an additional fastener opening 88. Each additional fastener opening 88 has a generally square or rectangular shape (or other shape) and is alignable with corresponding fastener opening 56 in the cable tray fitting 14 and through which a fastener 74 is received.

In one method of assembling the cable tray assembly 10, the longitudinal ends of the cable tray section 12 and the cable tray fitting 14 are brought together so that the webs 30, 50 of the corresponding rails 24, 44 are generally abutted. Each fitting splice plate 16 is positioned on the cable tray section 12 and the cable tray fitting 14 so that the fitting splice plate lies generally flush against the outboard faces of the webs 30, 50 of the respective cable tray section and the cable tray fitting. The fitting splice plates 16 are secured to the cable tray section 12 and the cable tray fitting 14 by inserting the suitable fasteners 74 (e.g., bolts) into the aligned fastener openings 36, 56, 70, 88 in the cable tray section 12, the cable tray fitting 14, and the fitting splice plate 16, and tightening nuts 90 on the fasteners. The alignment tabs 82 of the fitting splice plates 16 are inserted into corresponding fastener openings 56 of the cable tray fittings 14 before inserting and/or tightening nuts 90 on the fasteners 74. The alignment tabs 82 facilitate alignment of the fitting splice plate 16 on the cable tray fitting 14.

Figure 4:
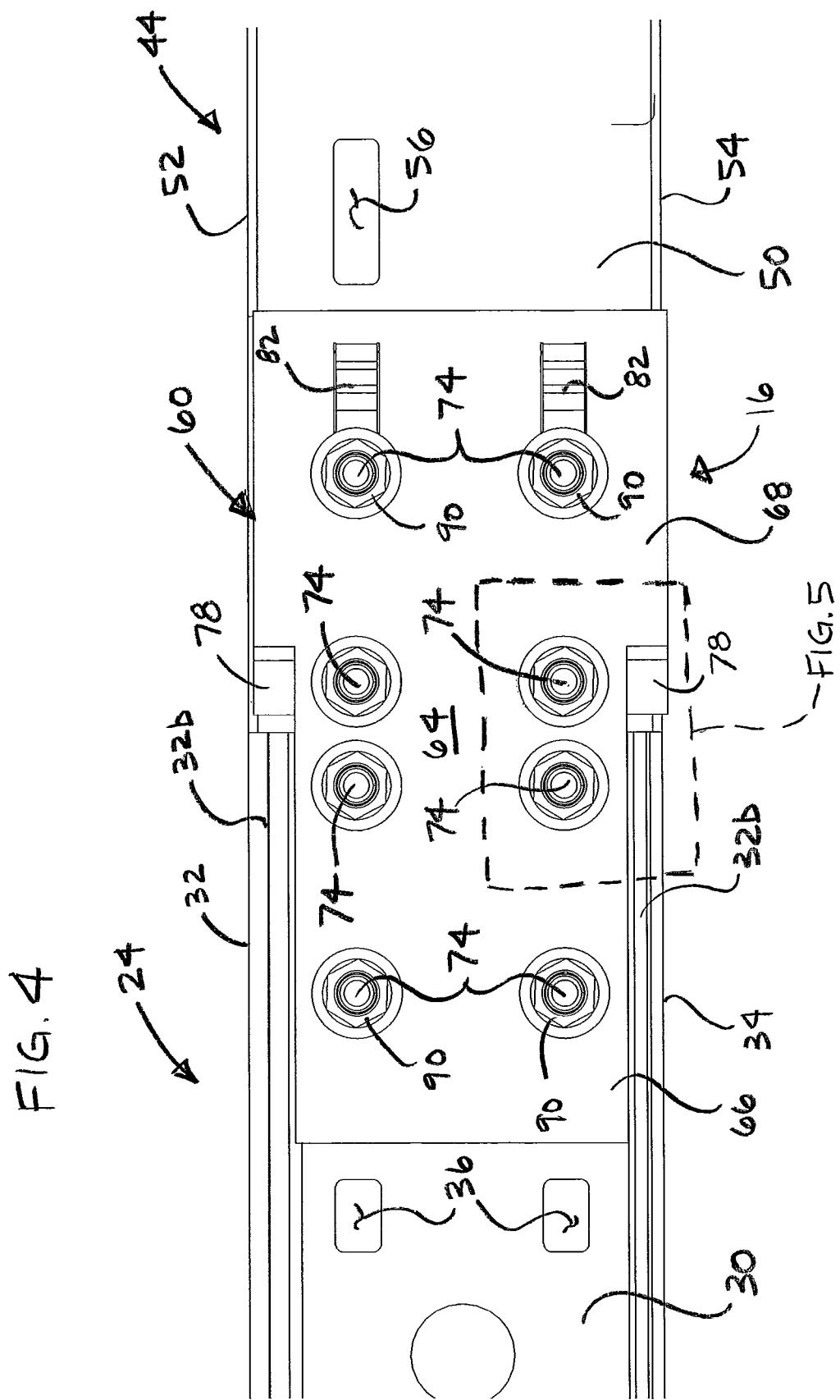
FIG. 4 is an enlarged elevational view of one of the junctures of the fitting splice plate, the cable tray section and the cable tray fitting.
Figure 5:
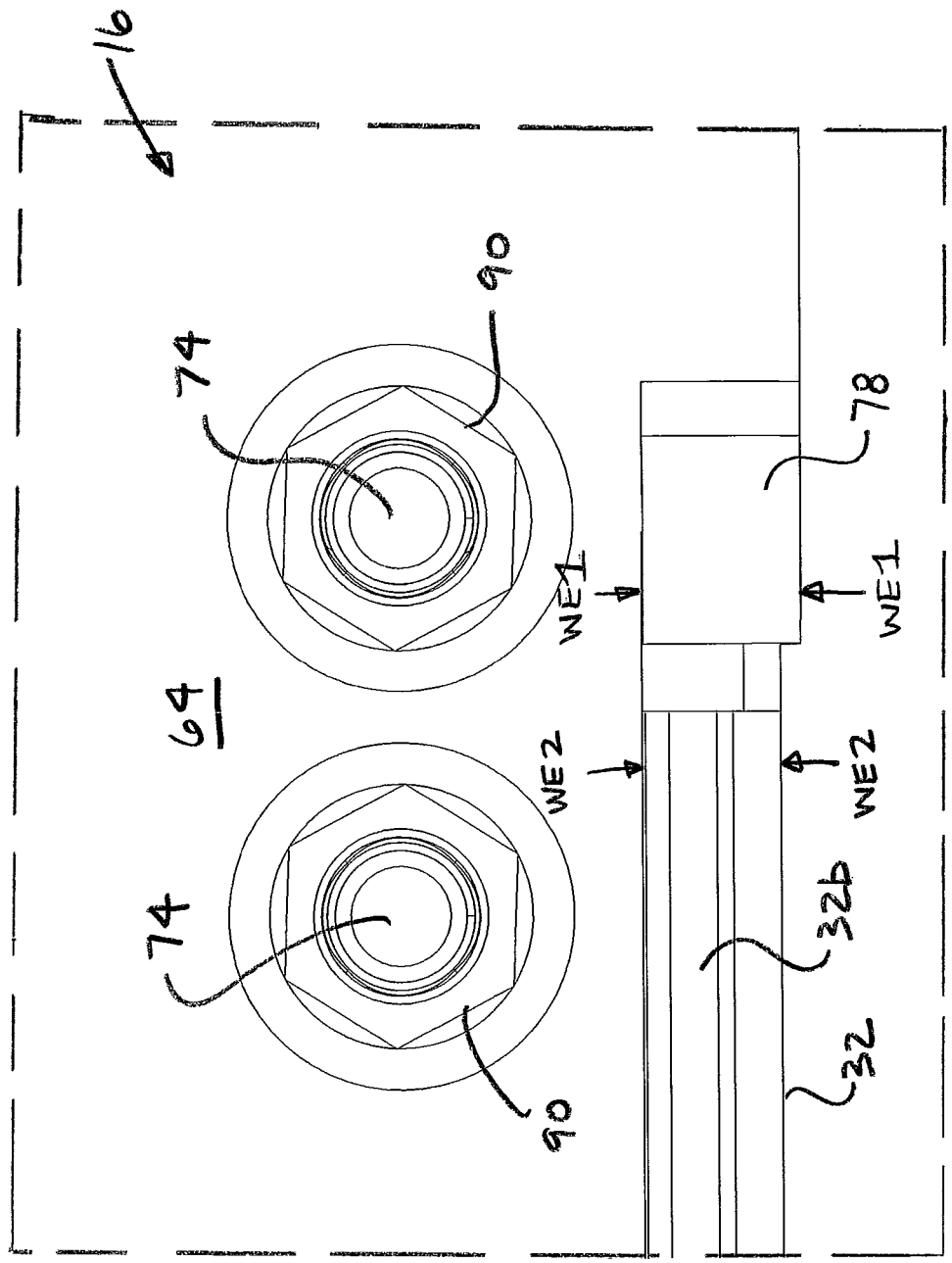
FIG. 5 is an enlarged partial view of FIG. 4.
Figure 6:
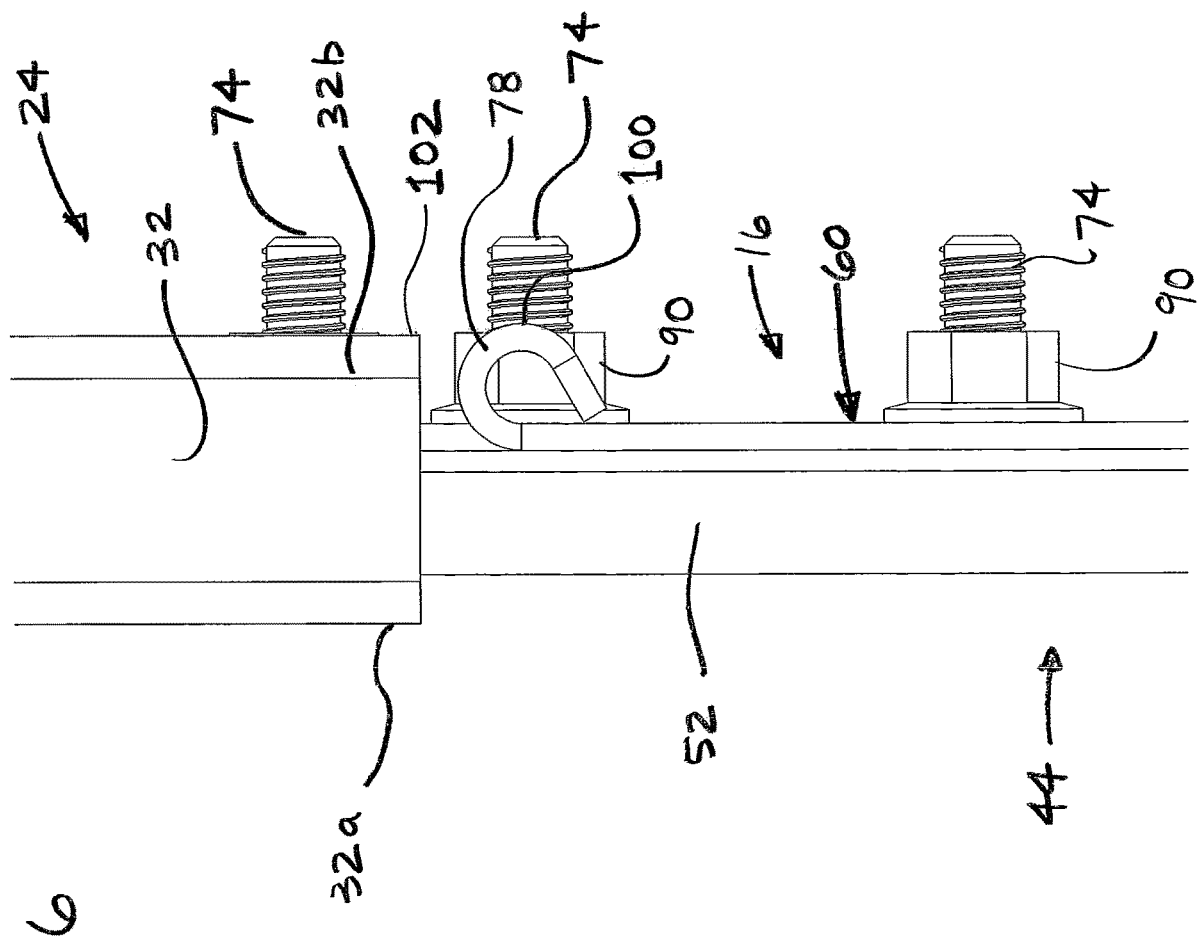
FIG. 6 is an enlarged top plan view of one of the junctures of the fitting splice plate, the cable tray section and the cable tray fitting.
Figure 7:
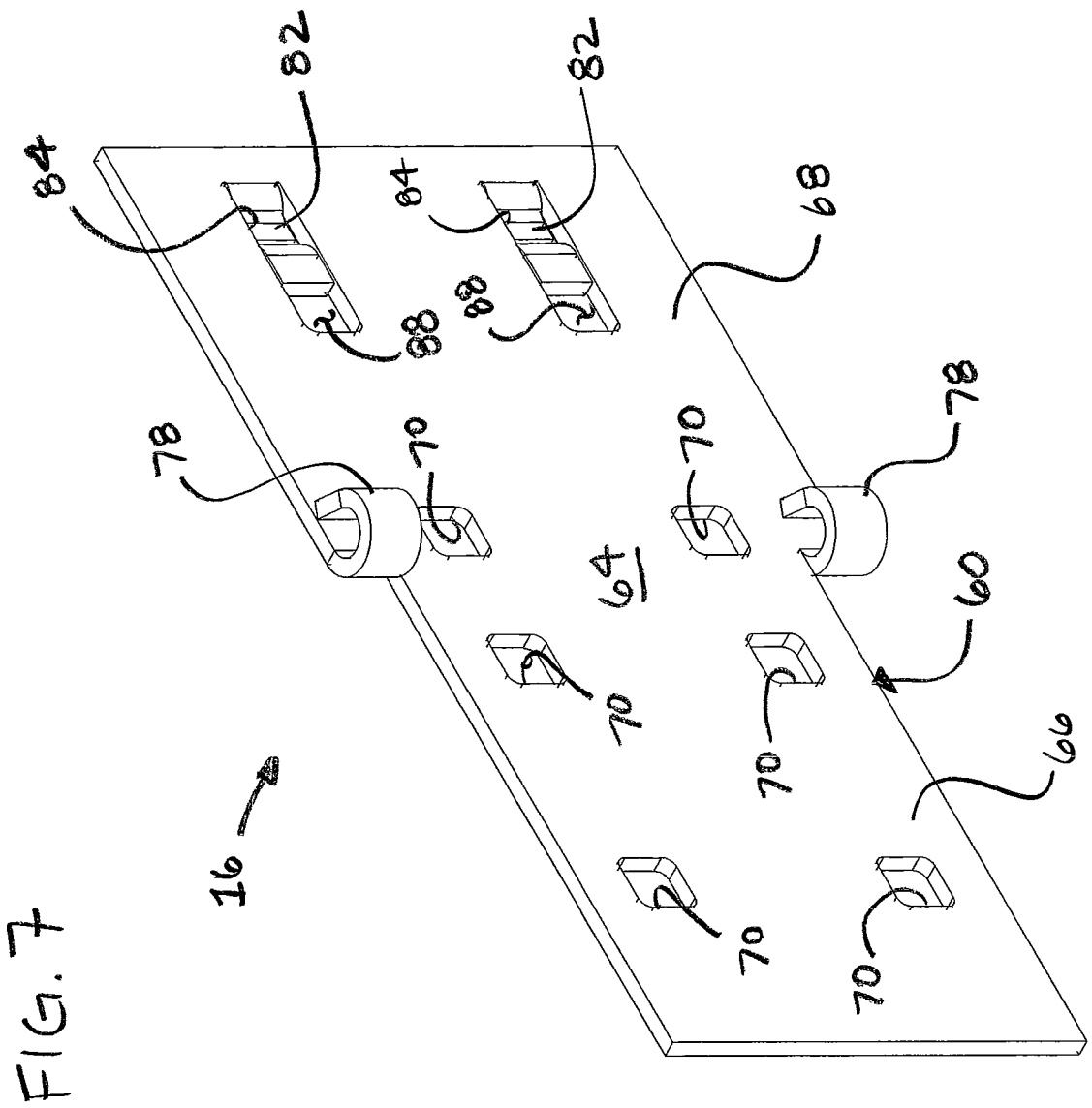
FIG. 7 is a front perspective of the fitting splice plate.
Figure 8:
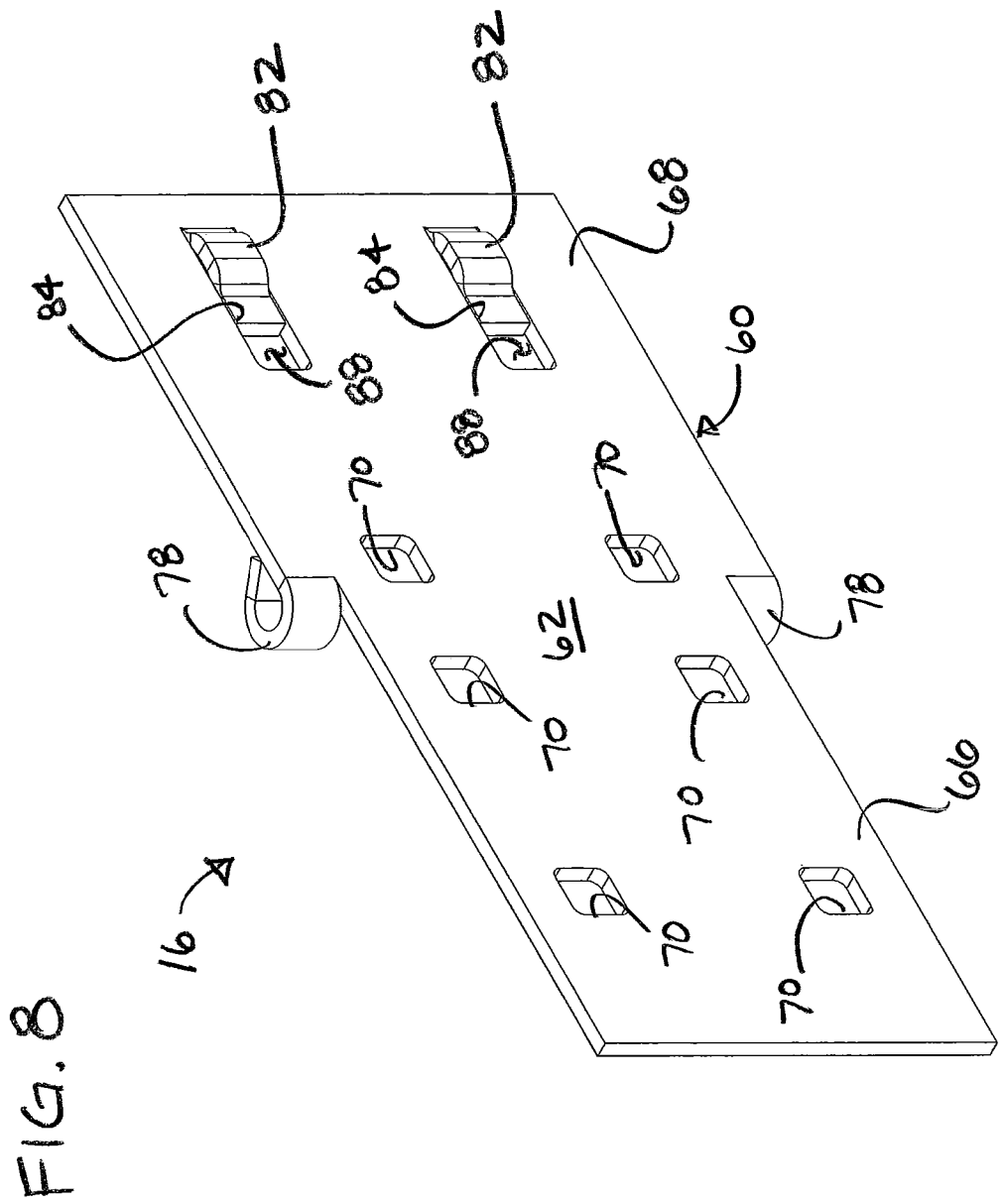
FIG. 8 is a rear perspective of the fitting splice plate.

As shown in FIGS. 4-6, the upper and lower guards 78 are configured to generally oppose the outboard portions 32b, 34b of the respective upper and lower flanges 32, 34 of the corresponding rail 24 of the cable tray section 12. As shown in FIG. 6, the upper and lower guards 78 have outboard extents 100 that are substantially equal to or greater than outboard extents 102 of the outboard portions 32b, 34b of the respective upper and lower flanges 32, 34. Moreover, referring to FIG. 5, widthwise (or heightwise as illustrated) extents WE1 of the upper and lower guards 78 (only the lower guard being shown in FIG. 5) are substantially equal to or greater than widthwise (or heightwise as illustrated) extents WE2 of the outboard portions 32b, 34b of the respective upper and lower flanges 32, 34. In this way, the upper and lower guards 78 effectively shield the outboard and widthwise extents of the outboard portions 32b, 34b of the respective upper and lower flanges 32, 34 of the corresponding rail 24 of the cable tray section 12 at the juncture of the cable tray section and the cable tray fitting 14 (e.g., at the longitudinal ends of the cable tray section and the cable tray fitting). Thus, the upper and lower guards 78 protect against a user being injured due to the longitudinal ends of the outboard portions 32b, 34b of the respective upper and lower flanges 32, 34 protruding laterally outward relative to the corresponding rails 44 of the cable tray fitting 14. As illustrated, the upper and lower guards 78 may be spaced a longitudinal distance from the longitudinal ends of the upper and lower flanges 32, 34 of the cable tray section 12. In another embodiment, the upper and lower guards 78 may abut the longitudinal ends of the upper and lower flanges 32, 34 of the cable tray section 12. The upper and lower guards 78 also provide the function of inhibiting canting of the fitting splice plate 16 by acting as stops, thereby facilitating alignment of the fitting splice plate on the cable tray section 12 and the cable tray fitting 14.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray assembly comprising:
a cable tray section comprising a rail including a vertical web and upper and lower flanges extending from the vertical web and having outboard portions;
a cable tray fitting; and
a fitting splice plate connecting the cable tray fitting to the cable tray section, the fitting splice plate comprising:
a plate body having a generally planar shape, the plate body having a first longitudinal portion connected to the cable tray section, and a second longitudinal portion connected to the cable tray fitting, wherein the first longitudinal portion has a width extending between upper and lower sides thereof; and
a guard extending in an outboard direction from the second longitudinal portion adjacent the first longitudinal portion, wherein the guard is adjacent one of an upper side and a lower side of the second longitudinal portion such that when the guard is adjacent the upper side of the second longitudinal portion, at least a portion of the guard is disposed above the upper side of the first longitudinal portion, and when the guard is adjacent the lower side of the second longitudinal portion, at least a portion of the guard is disposed below the lower side of the first longitudinal portion,
wherein the guard is configured to oppose the outboard portion of one of the upper and lower flanges of the rail of the cable tray section, and
wherein the guard has an outboard extent equal to or greater than an outboard extent of one of the upper and lower flanges, and the guard has a widthwise extent equal to or greater than a widthwise extent of one of the upper and lower flanges of the rail of the cable tray section.

2. The cable tray assembly set forth in claim 1, wherein the guard is adjacent the upper side of the second longitudinal portion, wherein at least a portion of the guard is disposed above the upper side of the first longitudinal portion.

3. The cable tray assembly forth in claim 1, wherein the guard is adjacent the lower side of the second longitudinal portion, wherein at least a portion of the guard is disposed below the lower side of the first longitudinal portion.

4. The cable tray assembly set forth in claim 3, further comprising a second guard extending in an outboard direction from the second longitudinal portion adjacent the first longitudinal portion, wherein the second guard is adjacent the upper side of the second longitudinal portion, wherein at least a portion of the second guard is disposed above the upper side of the first longitudinal portion.

5. The cable tray assembly set forth in claim 1, wherein the width of the first longitudinal portion extending between the upper and lower sides of the first longitudinal portion is less than a width of the second longitudinal portion extending between the upper and lower sides of the second longitudinal portion.

6. The cable tray assembly set forth in claim 1, wherein the guard comprises an inturned finger folded over an outboard face of the second longitudinal portion to define a generally round edge.

7. The cable tray assembly set forth in claim 6, wherein the guard is integrally formed with the plate body as a single, one-piece, monolithically formed component.

8. The cable tray assembly set forth in claim 1, further comprising a tab projecting from the plate body in an inboard direction.

9. The cable tray assembly set forth in claim 8, wherein the tab comprises a finger received in a finger opening defined by the plate body, wherein the finger is bent along its length so that a bent portion of the finger defines the tab projecting from the plate body in the inboard direction.

10. The cable tray assembly set forth in claim 9, wherein the finger has an attached longitudinal end attached to the plate body, a free longitudinal end free from attachment to the plate body, and upper and lower sides free from attachment to the plate body so that the finger is cantilevered.

11. The cable tray assembly set forth in claim 10, wherein the free longitudinal end of the finger is spaced apart from an opposing longitudinal end of the finger opening to define a fastener opening configured to receive a fastener.

12. The cable tray assembly set forth in claim 11, wherein the fastener opening has a generally rectangular shape.

13. The cable tray assembly set forth in claim 12, wherein the finger is integrally formed with the plate body as a single, one-piece, monolithically formed component.

14. The cable tray assembly set forth in claim 1, wherein the first and second longitudinal portions of the plate body define a plurality of fastener openings for receiving fasteners therein.

15. The cable tray assembly set forth in claim 1, wherein the rail of the cable tray section has a generally I-shaped cross section.

16. The cable tray assembly set forth in claim 1, wherein the cable tray fitting comprises a rail including a vertical web and being free from upper and lower flanges extending in an outboard direction from the vertical web of the rail of the cable tray fitting, wherein the second longitudinal portion of the plate body is connected to the web of the rail of the cable tray fitting.

17. The cable tray assembly set forth in claim 16, wherein the rail of the cable tray fitting includes upper and lower flanges extending in an inboard direction from the vertical web.

18. The cable tray assembly set forth in claim 16, wherein a plurality of first fasteners connect the first longitudinal portion of the fitting splice plate to the web of the rail of the cable tray section, wherein a plurality of second fasteners connect the second longitudinal portion of the fitting splice plate to the web of the rail of the cable tray fitting.

19. The cable tray assembly set forth in claim 18, wherein the cable tray section is straight, and the cable tray fitting is curved.

* * * * *